(12) United States Patent
Nousiainen et al.

(10) Patent No.: US 10,023,810 B2
(45) Date of Patent: Jul. 17, 2018

(54) PROCESS FOR PRODUCING HYDROCARBONS FROM CRUDE TALL OIL AND TALL OIL PITCH

(71) Applicant: UPM-KYMMENE CORPORATION, Helsinki (FI)

(72) Inventors: Jaakko Nousiainen, Lappeenranta (FI); Petri Kukkonen, Helsinki (FI); Jari Kotoneva, Lappeenranta (FI); Teemu Lindberg, Lappeenranta (FI); Timo Äijälä, Ylöjärvi (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/027,737

(22) PCT Filed: Oct. 16, 2014

(86) PCT No.: PCT/FI2014/050786
§ 371 (c)(1),
(2) Date: Apr. 7, 2016

(87) PCT Pub. No.: WO2015/055896
PCT Pub. Date: Apr. 23, 2015

(65) Prior Publication Data
US 2016/0257888 A1    Sep. 8, 2016

(30) Foreign Application Priority Data
Oct. 17, 2013    (FI) ..................................... 20136031

(51) Int. Cl.
*C10G 3/00*    (2006.01)
(52) U.S. Cl.
CPC ............ *C10G 3/50* (2013.01); *C10G 3/42* (2013.01); *C10G 3/48* (2013.01); *Y02P 30/20* (2015.11)

(58) Field of Classification Search
CPC ... C01G 3/48; C01G 3/50; C10G 3/42; C10G 3/50; Y02P 30/20
(Continued)

(56) References Cited

U.S. PATENT DOCUMENTS

| 1,593,030 A | * | 7/1926 | Palmer | ...................... C09F 3/00 |
| | | | | 106/285 |
| 3,238,164 A | * | 3/1966 | Speck | ...................... C08L 9/06 |
| | | | | 524/273 |

(Continued)

FOREIGN PATENT DOCUMENTS

| EP | 1586624 A1 | 10/2005 |
| WO | 2009131510 | 10/2009 |

(Continued)

OTHER PUBLICATIONS

International Search Report dated Feb. 6, 2015; International Application No. PCT/FI2014/050786; International Filing Date Oct. 16, 2014 (3 pages).

(Continued)

*Primary Examiner* — Philip Louie
*Assistant Examiner* — Aaron Pierpont
(74) *Attorney, Agent, or Firm* — Cantor Colburn LLP

(57) ABSTRACT

The present invention relates to a process for producing hydrocarbons, wherein the process comprises the steps of, subjecting a feedstock comprising CTO and TOP to pretreatment comprising at least two evaporative steps to yield (i) an evaporated feedstock comprising 30 ppm or less of sodium, 35 ppm or less of phosphorus and 30 ppm or less of silicon, (ii) a light fraction and (iii) a residue fraction, and subjecting the evaporated feedstock to catalytic hydroprocessing in the presence of hydrogen to yield a hydroprocessing product comprising hydrocarbons boiling in the liquid fuel range. The invention also relates to hydrocarbon (Continued)

components useful as transportation fuel or as a blending component in transportation fuel, obtainable by said process.

56 Claims, 1 Drawing Sheet

(58) Field of Classification Search
USPC .......................................................... 585/357
See application file for complete search history.

(56) References Cited

U.S. PATENT DOCUMENTS

| | | | |
|---|---|---|---|
| 2002/0107168 A1* | 8/2002 | Hamunen | ............... C11D 3/001 510/458 |
| 2013/0041192 A1* | 2/2013 | Saviainen | ............... C10L 1/026 585/16 |
| 2013/0245342 A1 | 9/2013 | Laumola et al. | |

FOREIGN PATENT DOCUMENTS

| WO | WO 2009131510 A1 * | 10/2009 | ............... C10L 1/026 |
|---|---|---|---|
| WO | 2012069706 A2 | 5/2012 | |
| WO | WO 2012069704 A1 * | 5/2012 | ............... C10G 3/42 |
| WO | WO 2012069706 A2 * | 5/2012 | ............... C10G 3/42 |

OTHER PUBLICATIONS

Written Opinion dated Feb. 6, 2015; International Application No. PCT/FI2014/050786; International Filing Date Oct. 16, 2014 (3 pages).

* cited by examiner

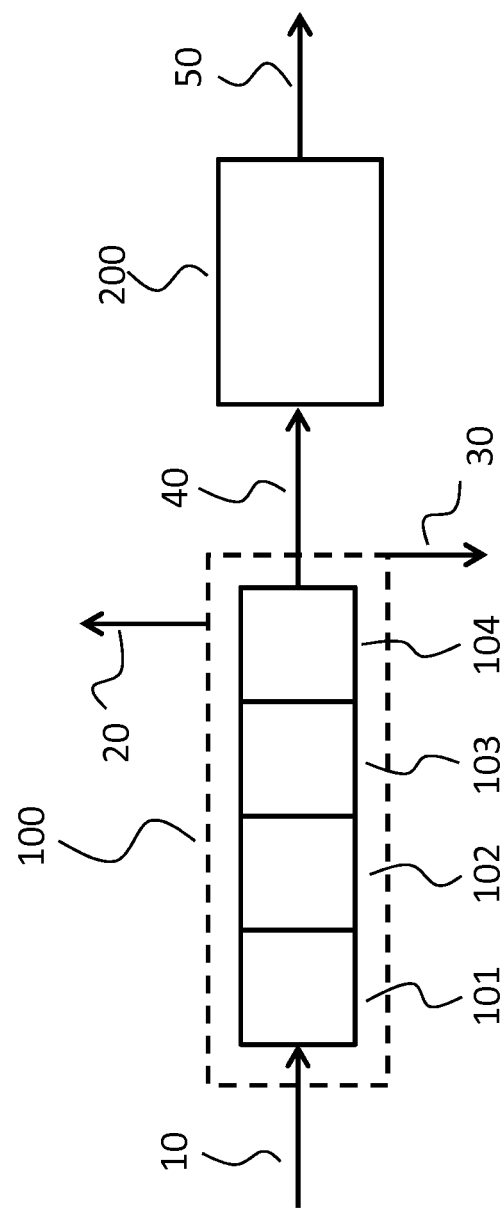

PROCESS FOR PRODUCING HYDROCARBONS FROM CRUDE TALL OIL AND TALL OIL PITCH

CROSS-REFERENCE TO RELATED APPLICATIONS

This application is a National Stage application of PCT/FI2014/050786, filed Oct. 16, 2014, which claims the benefit of Finnish Application No. 20136031, filed Oct. 17, 2013, both of which are incorporated by reference herein in their entirety.

FIELD OF THE INVENTION

The present invention relates generally to a process for producing hydrocarbons useful as liquid fuels or fuel blending components, where feedstock comprising crude tall oil and tall oil pitch is subjected to pretreatment comprising at least two evaporative steps, followed by catalytic hydroprocessing.

BACKGROUND OF THE INVENTION

Crude tall oil (CTO) is derived from the chemical pulping of woods. It is typically composed of a mixture of resin acids, fatty acids, sterols, alcohols, neutral substances, unsaponifiable matter and some non-acid materials. CTO can be distilled to obtain tall oil resin acids (TOR) containing more than 10 wt % of resin acid content. CTO may also be refined to tall oil fatty acids (TOFA), where the resin acid content is typically less than 10 wt %.

Tall oil pitch (TOP) is obtained as a nonvolatile residue from refining of CTO. The yield of TOP in the refining process may range from about 15 to 50 wt %, depending for example on the quality and composition of the CTO. TOP typically comprises neutral substances, free acids including resin acids and fatty acids, fatty acid esters, bound and free sterols, and polymeric compounds. Additionally metals, metal cations, inorganic and organic compounds including metal resinates and salts of fatty acids can be found in TOP. Said metal cations typically originate from wood and fertilizers.

CTO may be used as feedstock in hydroprocessing to produce hydrocarbons. However, as metals, compounds containing metals and other impurities are regarded as harmful to hydroprocessing catalysts, it is necessary to purify CTO before it enters the hydroprocessing catalyst beds. Typically CTO is subjected to one or more purifications steps, such as depitching, whereby a nonvolatile pitch residue containing high molecular weight compounds and contaminants is separated and in most cases disposed of by burning.

The utilization of TOP is limited, generally it is burnt, but some of it is used in asphalt emulsions, cement emulsions and printing inks.

Some methods for the purification of TOP are known in the art. However, to a significant extent valuable material present in TOP still cannot be utilized in an effective way.

There is an increasing need for biofuels, suitable as liquid fuels as such, particularly for transportation fuels, or compatible with said fuels. Biofuels are typically manufactured from purified feedstock originating from renewable sources, such as plant oils, animal fats, algal oils, fish oils, and the like. The common feature of these materials is that they are composed of glycerides and free fatty acids, and in many cases they are subjected to catalytic hydroprocessing as such. Usually, low quality feedstock containing contaminants, often of more heterogeneous nature, is regarded as more difficult to convert by catalytic hydroprocessing, and/or it requires more complicated equipment.

Despite the ongoing research and development of processes for the manufacture of liquid fuels, there is still a need to provide an improved process for producing hydrocarbons useful as liquid fuels or fuel blending components, from feedstock comprising contaminants and impurities.

SUMMARY OF THE INVENTION

The present invention relates to a process for producing hydrocarbons useful as liquid fuels or fuel blending components, wherein feedstock comprising crude tall oil (CTO) and tall oil pitch (TOP) is subjected to pretreatment whereby metals, phosphorus, silicon and compounds containing metals, phosphorus and silicon, are removed to provide a pretreated feedstock, which is directed to catalytic hydroprocessing. In said hydroprocessing the pretreated feedstock is converted to hydrocarbons, suitable as liquid fuels and fuel blending components, useful as transportation fuels or as blending components in said fuels.

The pretreatment removes effectively impurities harmful particularly to the hydroprocessing catalysts, a heavy residue fraction comprising hydrocarbons having 30 or more carbon atoms in their molecular structure and neutral substances, a light fraction comprising gases and hydrocarbons having typically 1-5 carbon atoms in their molecular structure, and water. In the pretreated feedstock the levels of said impurities, particularly sodium, phosphorus and silicon are sufficiently low for avoiding problems in the subsequent hydroprocessing.

Accordingly the invention relates to a process for producing hydrocarbons, where the process comprises the steps of, subjecting a feedstock comprising CTO and TOP to a pretreatment comprising at least two evaporative steps to yield (i) an evaporated feedstock comprising 30 ppm or less of sodium, 35 ppm or less of phosphorus and 30 ppm or less of silicon, (ii) a light fraction and (iii) a heavy residue fraction, and the evaporated feedstock is subjected to catalytic hydroprocessing in the presence of hydrogen to yield a hydroprocessing product comprising hydrocarbons boiling in the liquid fuel range.

The present invention also relates to products obtainable by said process.

Thus an object of the invention is to provide a process for effectively and economically converting feedstock comprising CTO and TOP to liquid fuels, suitably transportation fuels and blending components for said fuels, whereby the valuable components contained in tall oil pitch can be utilized instead of disposing by burning.

Another object of the invention is to provide a process where TOP can be co-processed with CTO for effectively and economically converting feedstock comprising tall oil and tall oil pitch to liquid fuels.

Characteristic features of the invention are presented in the appended claims.

DEFINITIONS

The term "hydroprocessing" refers here to catalytic processing of feedstock originating from renewable sources by all means of molecular hydrogen.

The term "hydrotreatment" refers here to a catalytic process, which removes oxygen from organic oxygen compounds as water (hydrodeoxygenation, HDO), sulphur from organic sulphur compounds as dihydrogen sulphide (hydrodesulphurisation, HDS), nitrogen from organic nitrogen compounds as ammonia (hydrodenitrogenation, HDN) and halogens, for example chlorine from organic chloride compounds as hydrochloric acid (hydrodechlorination, HDCl). The term "deoxygenation" refers here to the removal of oxygen from organic molecules, such as carboxylic acid derivatives, alcohols, ketones, aldehydes or ethers.

The term "hydrodeoxygenation" (HDO) refers to the removal of carboxyl oxygen as water by the means of molecular hydrogen under the influence of catalyst. The term "decarboxylation" and/or "decarbonylation" refers here to the removal of carboxyl oxygen as $CO_2$ (decarboxylation) or as CO (decarbonylation) with or without the influence of molecular hydrogen.

The term "hydrocracking" refers here to catalytic decomposition of organic hydrocarbon materials using molecular hydrogen at high pressures.

The term "hydrodewaxing" refers here to catalytic treatment of organic hydrocarbon materials using molecular hydrogen at high pressures to reduce the wax content by isomerization and/or cracking.

The term "hydrogenation" means here saturation of carbon-carbon double bonds by means of molecular hydrogen under the influence of a catalyst.

The term "neutral components" or "neutral fraction" or "neutral materials", refers here to all neutral organic components in heavy fractions or residues obtained in treating or processing material of biological origin. Examples of said materials of biological origin are tall oil pitch and tall oil materials. Examples of neutral components contained for example in tall oil pitch include sterols, stanols, sterol and stanol esters, polymeric acids, polymeric neutral substances, dimers, trimers, lignin derivatives, resin acids and fatty acids and esters thereof.

The term "unsaponifiables" refers here to substances which cannot be saponified by caustic treatment, such as higher aliphatic alcohols, sterols, and hydrocarbons.

Transportation fuels refer to fractions or cuts or blends of hydrocarbons having distillation curves standardized for fuels, such as for diesel fuel (middle distillate from 160 to 380° C., EN 590), gasoline (40-210° C., EN 228), aviation fuel (160 to 300° C., ASTM D-1655 jet fuel), kerosene, naphtha, etc.

Hydrocarbons boiling in the liquid fuel range refer to hydrocarbons having distillation curves standardized for fuels are presented above.

BRIEF DESCRIPTION OF THE DRAWINGS

The FIGURE is a schematic flow diagram representing one embodiment of the process.

DETAILED DESCRIPTION OF THE INVENTION

It was found out that TOP can be co-processed with CTO to provide hydrocarbons suitable as liquid fuels. Several advantageous effects may be achieved when utilizing the process for producing hydrocarbons from feedstock comprising CTO and TOP.

The process for producing hydrocarbons comprises the steps of subjecting a feedstock comprising CTO and TOP to a pretreatment comprising at least two evaporative steps to yield (i) an evaporated feedstock comprising 30 ppm or less of sodium, 35 ppm or less of phosphorus and 30 ppm or less of silicon, (ii) a light fraction and (iii) a heavy residue fraction, and subjecting the evaporated feedstock to catalytic hydroprocessing in the presence of hydrogen to yield a hydroprocessing product comprising hydrocarbons boiling in the liquid fuel range. Said light fraction comprises gases, light hydrocarbons typically having 1-5 carbon atoms in their molecular structure, and water. The heavy residue fraction comprises hydrocarbons having 30 or more carbon atoms in their molecular structure, neutral substances and impurities comprising metals, P, S and inorganic compounds. The evaporated feedstock comprises fatty acids and 30 ppm or less of sodium, 35 ppm or less of phosphorus and 30 ppm or less of silicon.

The process provides very simple and economic means for utilizing TOP, which is generally regarded as low value residue containing high amounts of impurities. In the present process TOP is used as a valuable co-feed in the manufacture of hydrocarbons.

TOP typically comprises a complicated mixture of high molecular weight polymeric compounds and various salts formed of high molecular weight organic compounds and inorganic ions. These substances typically have high boiling points and generally the removing of metals, phosphorus and silicon therefrom is difficult. The process makes it possible to utilize the valuable components contained in TOP instead of disposing them by burning. The overall amount of residue remaining after the process can be decreased. Further, the consumption of hydrogen can be decreased.

In the FIGURE one embodiment of the process for producing hydrocarbons is shown. Feedstock 10 comprising CTO and TOP is directed to pretreatment unit 100 comprising four evaporative units 101, 102, 103 and 104, where the feedstock 10 is evaporated and a light fraction 20 comprising gases, light hydrocarbons and water, heavy residue fraction 30 comprising hydrocarbons having 30 or more carbon atoms in their molecular structure, neutral substances and impurities, and evaporated feedstock 40 comprising mainly fatty acids and 30 ppm or less of sodium, 35 ppm or less of phosphorus and 30 ppm or less of silicon are obtained. The evaporated feedstock 40 is directed hydroprocessing unit 200, where the evaporated feedstock 40 is subjected to catalytic hydroprocessing and a hydroprocessing product 50 comprising hydrocarbons boiling in the liquid fuel range is obtained.

According to one embodiment, the process for producing hydrocarbons comprises the steps, where the feedstock comprises at least 50 wt % of CTO and 0.1-40 wt % of TOP.

Suitably the feedstock comprises at least 60 wt % of CTO, particularly suitably 70 wt % of CTO, even more suitably 80 wt % of CTO and still more suitably 90 wt % of CTO.

Suitably the feedstock comprises 2.5-30 wt % of TOP, particularly suitably 2.5-20 wt % of TOP and especially 2.5-10 wt % of TOP.

According to one embodiment the evaporated feedstock comprises 30 ppm or less of sodium, suitably 25 ppm or less of sodium and particularly suitably 15 ppm or less of sodium.

According to one embodiment the evaporated feedstock comprises 35 ppm or less of phosphorus, suitably 25 ppm or less of phosphorus and particularly suitably 20 ppm or less of phosphorus.

According to one embodiment the evaporated feedstock comprises 30 ppm or less of silicon, suitably 20 ppm or less of silicon and particularly suitably 10 ppm or less of silicon.

According to one embodiment the amount of TOP in the feedstock is adjusted to provide the sodium content in the feedstock not more than 170 ppm, suitably not more than 160 ppm, particularly suitably not more than 150 ppm, especially not more than 140 ppm.

According to one embodiment the amount of TOP in the feedstock is adjusted to provide the phosphorus content in the feedstock not more than 80 ppm, suitably not more than 70 ppm, particularly suitably not more than 60 ppm, especially not more than 50 ppm.

According to one embodiment, the amount of TOP in the feedstock is adjusted to provide the silicon content in the feedstock not more than 50 ppm, suitably not more than 40 ppm, particularly suitably not more than 35 ppm, especially not more than 32 ppm.

All amounts (ppm) are calculated based on elemental material. Metals refer here to elements defined as metals in the Periodic Table of elements, including alkali metals, alkaline earth metals, transition metals and other metals. Phosphorus and silicon belong to non-metals.

According to one embodiment the amount of CTO in the feedstock is at least 60 wt %, the amount of TOP in the feedstock is 2.5-30 wt %, and the evaporated feedstock comprises 30 ppm or less of sodium, 35 ppm or less of phosphorus and 30 ppm or less of silicon.

According to one embodiment the amount of CTO in the feedstock is at least 70 wt %, the amount of TOP in the feedstock is 2.5-20 wt %, and the evaporated feedstock comprises 25 ppm or less of sodium, 25 ppm or less of phosphorus and 20 ppm or less of silicon.

According to one embodiment the amount of CTO in the feedstock is at least 80 wt %, the amount of TOP in the feedstock is 2.5-10 wt %, and the evaporated feedstock comprises 15 ppm or less of sodium, 20 ppm or less of phosphorus and 10 ppm or less of silicon.

According to still another embodiment the amount of CTO in the feedstock is at least 90 wt %.

Feedstock

The feedstock comprises at least 50 wt % of CTO. CTO is understood to mean here tall oil material. Tall oil material comprises one or more of tall oil components, tall oil derivatives and any combinations thereof, including tall oil, crude tall oil (CTO), tall oil fatty acids (TOFA), tall oil soap, resin acids, unsaponifiables, and soap oil etc. CTO refers to processed mixtures of naturally-occurring compounds extracted from wood species, such as birch, pine, spruce and aspen and the like. CTO is typically derived from pulping of coniferous wood.

CTO is mainly composed of both saturated and unsaturated oxygen-containing organic compounds such as neutral substances, unsaponifiables, resin acids (mainly abietic acid and its isomers), fatty acids (mainly linoleic acid, oleic acid and linolenic acid), fatty alcohols, sterols, other alkyl hydrocarbon derivatives and turpentine components. The fatty acids of tall oil include mainly palmitic acid, oleic acid and linoleic acid. Handling and cooking of wood causes break down of the triglyceride structures and hence CTO does not contain any significant amounts of triglycerides. Typically, CTO contains impurities such as inorganic sulphur compounds, residual metals, such as Na, K, Ca, and phosphorus and silicon. The composition of CTO varies depending on the specific wood species.

The feedstock comprises 0.1-40 wt % of TOP. TOP refers here to tall oil pitch and it contains heavy residues originating from refining of tall oil materials.

TOP is particularly obtained as a nonvolatile residue from refining of CTO. TOP typically comprises neutral substances, about 10-30 wt % of free acids including resin acids and fatty acids, about 60 wt % of fatty acid esters, and bound and some free sterols, and polymeric compounds. Additionally metals, metal cations, phosphorus, silicon and inorganic and organic compounds, including metal resinates and salts of fatty acids can be found in TOP. Said metal cations typically originate from wood and fertilizers. TOP comprises typically polymeric compounds and other high molecular weight compounds including salts of organic compounds with inorganic ions, which have high boiling point and it is often difficult to remove metals, such as sodium, and phosphorus and silicon from those.

Optional co-feed or mixtures of co-feeds may also be used additionally in the process. Said co-feeds may be selected from resin acids and fatty acid esters.

Pretreatment

In the process for producing hydrocarbons feedstock comprising CTO and TOP and optional co-feeds, is subjected pretreatment comprising at least two evaporative steps to yield evaporated feedstock, a light fraction and a residue fraction.

Suitably said pretreatment comprises two or more evaporative steps, whereby the feedstock can be purified and the amounts of metals, particularly sodium, and phosphorus and silicon are reduced to levels allowing successful hydroprocessing in the subsequent hydroprocessing step. Water, metals, solids, compounds comprising metals, P, Si, sulfates, such as $Na_2SO_4$, and $H_2SO_4$ may be removed in the evaporative treatment.

The evaporative treatment results in evaporated feedstock, where the amount of sodium can be reduced to below 30 ppm, even below 25 ppm and even below 15 ppm. The amount of phosphorus can be reduced to amounts below 35 ppm, even below 25 ppm, and even below 20 ppm. The amount of silicon can be reduced to below 30 ppm, even below 20 ppm, and even below 10 ppm. Purification of the feedstock by evaporation enhances catalyst performance and lifetime.

The evaporative steps are carried out in an evaporation unit comprising at least two evaporators, suitably from two to four evaporators, particularly suitably four evaporators. Said evaporators are suitably arranged in series. The multi-step evaporation makes it possible to accomplish the evaporation in a controlled and effective manner that the amount of remaining residue small.

By evaporation is meant here any suitable separation method for separating two or more components from each other, such as gases from liquid, which separation method is based on utilizing the differences in the vapor pressure of the components. Examples of such separation methods are evaporation and distillation.

Examples of particularly suitable evaporation methods are those using thin film evaporation technique. The evaporators can thus be selected from thin film evaporators, falling film evaporators, short path evaporators, plate molecular stills and any other evaporators using thin film evaporation technology. The pretreatment unit can comprise two, three, four or more evaporators which can be either of the same type or different type and are selected independently.

The first evaporator may also comprise a flashing system and/or a heater system incorporated with or arranged upstream to the evaporator. The evaporative treatment is suitably carried out in an evaporation unit comprising evaporators arranged in series.

Flashing may be carried out in a flashing system comprising a heat exchanger, typically heated up to temperatures of about 200° C., and an expansion vessel operated typically under moderate vacuum of about 200-900 mbar (abs), where components which are volatile at the present conditions are released and can be separated from liquid components. Said liquid components are directed to further evaporation.

Said heater system may be any heating equipment suitable for heating and separation of volatile and light components. In this embodiment, the feedstock is first heated up under vacuum in a heater system to yield a gas phase and liquid phase. A suitable temperature is 150-230° C., at a pressure of 40-80 mbar (abs). Gas phase containing volatile and light components (such as turpentine) and water is separated.

According to an embodiment, the evaporation is performed by using two evaporators where the evaporation unit comprises a first and a second evaporator. In this embodiment, the first evaporator is suitably a thin film evaporator. Suitably the first evaporator operates at a temperature of 150-200° C., and a pressure of 10-20 mbar (abs). The gas phase containing volatile and light components and water is separated. The liquid fraction from the first evaporator is led to the second evaporator. A short path evaporator or a thin film evaporator or a plate molecular still can be used as the second evaporator. The second evaporator typically operates at a temperature of 300-390° C. and a pressure of 0.01-15 mbar (abs). The distillate, i.e. evaporated feedstock is fed to the subsequent process step. The residue fraction (heavy residual fraction) is discarded or used for other purposes.

According to another embodiment, the evaporation is performed by using three evaporators, i.e. the evaporation unit comprises a first evaporator, a second evaporator and a third evaporator. Water and light components are evaporated from the feedstock in the first evaporator in order to make the following evaporation steps more efficient. In the second and third evaporators the residue fraction containing pitch/heavy components is minimized by evaporating the liquid product from the first evaporator. In the three-step evaporation the liquid fraction from the second evaporator is directed to the third evaporator, from which the heavy evaporation residue containing mainly heavy polymeric components and pitch may be used as starting material in other processes, and the effluent, typically containing mainly fatty acids, is directed to the subsequent hydroprocessing step. In the three step evaporation the feedstock is fed to an evaporation unit comprising a first evaporator, a second evaporator and a third evaporator. In the first step, water and light components are removed at a temperature of 50-250° C. and a pressure of 5-100 mbar (abs), suitably at a temperature of 120-200° C. and a pressure of 10-55 mbar (abs) and a liquid product is obtained. The first evaporator is suitably a thin film evaporator or a falling film evaporator. In the second step the liquid product from the first evaporator is evaporated at a temperature of 180-350° C. and a pressure of 0.1-40 mbar (abs), suitably at a temperature of 200-270° C. and a pressure of 0.1-20 mbar (abs). The second evaporator is suitably a plate molecular still or a thin film evaporator. Particularly suitably the second evaporator is a thin film evaporator. The distillate from the second evaporator is recovered and the liquid fraction from the second evaporator is directed to a third evaporator. In the third evaporator the liquid fraction from the second evaporator is evaporated at a temperature of 200-450° C. and a pressure of 0-50 mbar (abs), suitably at a temperature of 300-390° C. and a pressure of 0.01-10 mbar (abs). The third evaporator is suitably a short path evaporator or a thin film evaporator. The effluent recovered from the third evaporator is combined with the distillate of the second evaporator to form the evaporated feedstock. The evaporated feedstock may be directed to the subsequent hydroprocessing step.

According to one embodiment of the invention the purification of the biological feed material is performed by using a heater and evaporator combination. Suitably said heater and evaporator combination comprises a heater and a series of evaporators. Suitably a combination of a heater and three evaporators is used.

According to still another embodiment of the invention, the evaporation is performed in four steps. The feedstock is fed to an evaporation unit comprising a first evaporator, a second evaporator, a third evaporator and a fourth evaporator. In the four-step evaporation the feedstock is evaporated in the first evaporator to produce a first fraction comprising water and light components, and a second fraction comprising heavier components and residues. The second fraction is evaporated in the second evaporator to produce a third fraction comprising water and low boiling light compounds and a fourth fraction comprising heavier components and residues. The fourth fraction is evaporated in the third evaporator to produce a fifth fraction comprising liquid components, typically mainly fatty acids and a sixth fraction comprising heavier components and residues. The sixth fraction is evaporated in the fourth evaporator to produce a seventh fraction comprising liquid components, typically mainly fatty acids and an eighth fraction comprising heavy evaporation residue. The fifth and seventh fractions are combined and recovered as the purified feedstock, which may be directed to the subsequent hydroprocessing step.

In the four step evaporation the first evaporator may be a falling film evaporator (falling film tube evaporator) or a plate molecular still or a thin film evaporator, suitably a falling film evaporator or plate molecular still is used, particularly suitably a falling film evaporator is used. The first evaporator may optionally comprise a flashing system and/or a heater system upstream or incorporated with the evaporator. The feedstock is evaporated in the first evaporator at the temperature from 80 to 150° C., suitably from 90 to 120° C. The evaporation is carried out under a pressure from 40 to 80 mbar (abs), suitably from 45 to 65 mbar (abs). A first fraction comprising water and some light components is separated and the second (liquid) fraction comprising the heavier components and residues, such as fatty acids, resin acids, neutral substances etc., is directed to the second evaporator. The falling film evaporator removes effectively a major amount of water present in the feed material, typically more than 50% by weight.

The second evaporator is a thin film evaporator or a short-path evaporator or a plate molecular still, suitably a thin film evaporator is used. The second evaporator operates at a temperature from 180 to 250° C., suitably from 190 to 220° C. A pressure of 40 to 80 mbar (abs), suitably from 45 to 65 mbar (abs) is used. A third fraction containing water and low boiling light hydrocarbon components, said fraction typically having boiling point of 100-210° C., suitably 100-170° C. at a normal pressure, is removed and the (liquid) fourth fraction is directed to the third evaporator. The third fraction, may be, if desired, be directed to the hydroprocessing step. Particularly suitably the first and second evaporators are operated under the same pressure. Suitably the same pressure vessel or pressure line is used.

The liquid fraction from the second evaporator is fed to the third evaporator. A thin film evaporator or plate molecular still or short path evaporator can be used, suitably the third evaporator is a short path evaporator. The third evaporator typically operates at a temperature of 200 to 350° C., suitably from 250 to 300° C. A pressure of 0.01 to 50 mbar (abs), suitably 0.5 to 10 mbar (abs), more suitably 1 to 5 mbar (abs) and particularly 2 to 3 mbar (abs) is used. A fifth fraction (distillate) comprising typically mainly fatty acids is separated and the remaining sixth fraction (liquid phase) is led to the fourth evaporator.

The fourth evaporator may be a short path evaporator or a plate molecular still, suitably a short path evaporator is used. Typical operating conditions include a temperature of 250 to 400° C., suitably from 290 to 360° C. A pressure of 0.01 to 10 mbar (abs), suitably 0.01 to 5 mbar (abs), more suitably 0.1 to 2 mbar (abs) is used. From the fourth evaporator, the seventh fraction (distillate) is obtained and it is combined with the distillate fraction (fifth fraction) obtained from the third evaporator to yield evaporated feedstock, which may be directed to the subsequent hydroprocessing step. The eighth fraction comprises the heavy evaporation residue or pitch, which is a very viscous fraction, amounting typically about 5% calculated from the feedstock.

The in the pretreatment step of the process carefully adjusted contents CTO and TOP in the feedstock, provide evaporated feedstock suitable for hydroprocessing. The contents of metals, particularly Na, and Si and P in the feedstock (total) may be controlled and the contents of CTO and TOP may be adjusted to provide acceptable evaporated feedstock for hydroprocessing.

The evaporation, particularly carried out in four step evaporation results in that the boiling takes place in a more controlled manner because low boiling light components, i.e. components having boiling point of 150-210° C. under normal pressure do not cause so much "carry over", i.e. migrating of impurities and compounds having a boiling point range at the higher end of the above boiling point ranges to the vapor in the subsequent evaporation step. The amounts of particularly phophorus, sodium and silicon can be effectively reduced in the pretreatment even when the feedstock contains 10 or 20 wt % of TOP.

Catalytic Hydroprocessing

In the process for producing hydrocarbons the evaporated feedstock obtained from the pretreatment is subjected to catalytic hydroprocessing in the presence of hydrogen to yield a hydroprocessing product comprising hydrocarbons boiling in the liquid fuel range.

The evaporated feedstock may be heated if necessary prior to feeding into a hydroprocessing reactor system, where it is subjected to catalytic hydroprocessing in the presence of hydrogen and catalyst(s) capable of effecting hydroprocessing reactions.

The hydroprocessing comprises at least one main reaction phase, where the hydroprocessing reactions, particularly HDO, HDW and HI take place, and additional optional pre-processing phases upstream the main reaction phase and optional post-processing phases downstream the main reaction phase.

Said catalytic hydroprocessing may be carried out in one stage where hydrodeoxygenation (HDO) and hydrodewaxing (HDW) are carried out in a hydroprocessing reactor system comprising one or more reactors.

Alternatively said catalytic hydroprocessing may be realized in at least two stages, where in the first stage hydrodeoxygenation (HDO) is carried out and in the second stage hydroisomerization (HI) and/or hydrodewaxing (HDW) is carried out. Suitably said stages are carried out in two or more reactors.

In the one stage alternative the hydroprocessing comprises hydrodeoxygenation and hydrodewaxing reactions on at least one catalyst. In one embodiment at least one catalyst capable of performing the desired reactions may be used. In another embodiment one or more HDO catalysts and one or more HDW/HI catalysts may be combined with each other in at least one catalyst bed of the reactor system. The combination may be provided in different ways such as by mixing or layering. A combination may be provided by physical mixing of catalyst particles or by adding catalyst metals onto the same support. In an embodiment, the catalysts may be arranged in separate catalyst layers situated on top of each other. In another embodiment, the catalysts may be arranged in separate catalyst beds situated in the same reactor. Yet in another embodiment, the catalysts may be arranged in separate reactors.

In the two stage embodiment, the catalysts comprise separate hydrodeoxygenation (HDO) catalyst and hydroisomerizing (HI) catalyst. These catalysts may be arranged in separate layers, in separate beds and in separate reactors, in such a way that the HDO catalyst is arranged upstream from the HI catalyst in the flow direction of the feedstock. The HI catalyst is suitably arranged in a separate reactor downstream from the HDO reactor. Suitably separation of a light gaseous side-stream is carried out after the hydrodeoxygenation and/or after the hydrosiomerization using outlets.

In the process in the catalytic hydroprocessing the HDO catalyst can be any HDO catalyst known in the art, suitable for the removal of hetero atoms (O, S, N) from organic compounds. In an embodiment of the invention, the HDO catalyst is selected from a group consisting of NiMo, CoMo, and a mixture of Ni, Mo and Co. NiMo catalysts are examples of very efficient catalyst in the process. Suitably the HDO catalyst is a supported catalyst and the support can be any oxide which is typically used in the art as support for HDO catalysts. The support is typically selected from $Al_2O_3$, $SiO_2$, $ZrO_2$, zeolites, zeolite-alumina, alumina-silica, alumina-silica-zeolite and activated carbon, and mixtures thereof.

In an embodiment of the invention, solid particles of $NiMo/Al_2O_3$ or $NiMo/SiO_2$ are used. In another embodiment $CoMo/Al_2O_3$, or $CoMo/SiO_2$ is used. In a further embodiment $NiMoCo/Al_2O_3$ or $NiMoCo/SiO_2$ is used. It is also possible to use a combination of HDO catalysts.

It is characteristic of the HDO and HDW catalysts that sulphur has to be present to maintain the catalytic activity of the catalysts. The zeolite in the HDW catalyst may be selected from the ones not sensitive to poisoning by low levels of sulphur. The catalysts are typically sulphided before start up by a sulphur containing compound such as hydrogen sulphide or dimethyl disulphide. Additional sulphur during operation is needed only in case the concentration of organic sulphur in the feed material is too low.

In an embodiment of the invention, the HDW catalyst is selected from hydrodewaxing catalysts typically used for isomerising and cracking paraffinic hydrocarbon feeds. Examples of HDW catalysts include catalysts based on Ni, W, and molecular sieves.

NiW is a HDW catalyst which is useful in the invention. It has excellent isomerising and dearomatizing properties and it also has the capacity of performing the hydrodeoxygenation and other hydrogenation reactions of biological feed materials, which are typically performed by HDO catalysts. Aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23 and ZSM 35. Other useful zeolites are zeolite beta and zeolite Y.

The HDW catalyst is also supported on an oxide support. The support materials may be the same as or different from those of the HDO catalyst.

In an embodiment of the invention the HDW catalyst is selected from $NiW/Al_2O_3$, $NiW/Al_2O_3$—$SiO_2$ and $NiW/zeolite/Al_2O_3$. These HDW catalysts are especially well suited for combining with the HDO catalyst of the invention since they also require sulphidizing for proper catalytic activity.

In a specific embodiment, a catalyst bed of the main reaction phase of the hydroprocessing reactor system comprises a combination of sulphided HDO and HDW catalysts, wherein the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulphurization and hydrodenitrification. The $NiW/zeolite/Al_2O_3$ catalyst mainly serves the purpose of hydroisomerisation, hydrogenation, hydrodearomatising, and hydrocracking. However, as mentioned above, NiW has the capacity also for some hydrodeoxygenation, hydrodesulphurisation and hydrodenitrification of the feedstock.

In an embodiment of the invention the HDW catalyst is combined with HDO catalyst in the first catalyst bed at the inlet end where the feed enters the main reaction phase. In case there are two or more catalyst beds in the main phase, the HDO and HDW catalysts are typically combined in at least two of the main catalyst beds of the reactor system. Combining of catalysts refers here to mixing, blending, and arranging catalyst layers on top of each other, whereby the boundary layer may comprise a blend of the catalysts.

The proportion of the HDO catalyst at the inlet end of the main reaction phase is typically higher than the proportion of HDW catalyst. In an embodiment of the invention the proportion of the HDW catalyst grows towards the outlet end of the reactor system. The last catalyst bed in the main reaction phase typically comprises only of HDW catalyst.

The proportion of HDO and HDW catalysts in the catalyst combination may vary depending on the feed material and the amount of heteroatoms, aromatic compounds and other impurities therein. The proportion of NiW and zeolite in the NiW/zeolite catalyst may also vary. As a general rule, NiW is the most abundant of the active catalysts in the reactor system. The skilled person will be able to select suitable catalyst compositions based on his knowledge of the feed, the reaction parameters and the desired distillate specification(s). For instance, a feed having a high amount of aromatics will require a relatively higher amount of HDW catalyst for cracking than is necessary for a feed with a low amount of aromatics.

In an embodiment of the two stage hydroprocessing alternative, the HI catalyst is selected from hydroisomerizing catalysts typically used for isomerizing paraffinic hydrocarbon feeds. Suitably the HI catalysts contain a Group VIII metal (e.g. Pt, Pd, Ni) and/or a molecular sieve. Preferred molecular sieves are zeolites (e.g. ZSM-22 and ZSM-23) and silicoaluminophosphates (e.g. SAPO-11 and SAPO-41). HI catalysts may also contain one or more of the support materials described above. In one embodiment, the HI catalyst comprises Pt, a zeolite and/or silicoaluminophosphate molecular sieve, and alumina. The support may alternatively or additionally contain silica.

According to one embodiment the hydroprocessing comprises a pre-processing phase, where the reactor system comprises least one catalytically active guard bed phase upstream of the main reaction phase. The purpose of the guard bed phase is to protect the main phase catalyst(s) from poisoning and fouling. The guard phase also prolongs the active operating time of the main phase catalysts.

According to one embodiment the evaporated feedstock is heated and led to the guard bed phase. The feed may also be directed to the guard bed phase without heating. Hydrogen gas is fed into the guard phase either separately or premixed with the feedstock. The guard bed phase is pressurized and heated in order to provide the desired removal of metals, and phosphorus from the feed.

Two or more guard beds are suitably arranged in series in the reactor system. The guard bed(s) may be combined in the same pressure vessel as the main catalyst beds or they may be provided in separate pressure vessel(s) upstream the hydroprocessing reactors.

At least one of the guard beds may contain active catalyst material for the removal of metals, and phosphorus, and converting of sulphur compounds present in the feed to the hydroprocessing. Converting of sulphur compounds may be adjusted to provide sulphur levels required in said feed for maintaining the activity of the HDO catalyst. The catalytically active materials are typically selected from Ni, Co, Mo, W, zeolites, $Al_2O_3$, $SiO_2$ and mixtures thereof. Examples of suitable catalysts are the ones used in HDO and HDW/HI.

In an embodiment of the invention at least one guard bed contains a combination of HDO catalyst and HDW catalyst. When the reactor system comprises two or more guard beds, at least one of the guard catalyst beds typically comprises HDW catalyst combined with HDO catalyst. The catalysts in question may contain the same active components as those described for the main phase above. However, the catalytic activity of the guard bed catalysts is typically lower than that of the main phase catalyst. For instance the NiMo catalyst used in a guard phase has a low hydrogenation activity and serves for demetallizing the feed, while the NiMo in the main phase has a high activity for hydrodeoxygenation. A combination of catalysts in a guard bed thus protects the main phase catalysts by removing metals, sulphur, phosphorus, etc. from the feed.

The guard beds and/or the main catalyst beds may comprise an inert layer at the inlet ends of the reactors and also between the catalyst beds. The catalysts may also be diluted with appropriate inert mediums. Dilution of the active catalysts serves to even out the exothermic reactions and to facilitate temperature control in the reactor(s). Examples of inert media include glass spheres and silica. In one embodiment of the invention, at least one of the catalysts is diluted with an inert material.

From the guard phase the flow is fed to the main reaction phase.

There may be several main catalyst beds operating in series or in parallel in the hydroprocessing reactor system. Typically there are one or two main catalyst beds operating in series. In an embodiment the process is designed to operate in such a way that the feed passes through a series of main catalyst beds as a continuous flow without intermediate outlets for by-products or other side streams. The number and size of the reaction vessels can be freely designed to suit the space available, taking into consideration the desired process and flow parameters. Thus, the main reaction phase may comprise one pressure vessel or it may be split into two or more pressure vessels.

Additional hydrogen gas is fed to the main phase to provide sufficient reagent for the various hydroprocessing reactions.

A number of chemical reactions take place in the hydroprocessing reactions in the catalyst beds. These reactions are well known as such and are not described in detail herein. The feedstock compounds containing oxygen, sulphur and nitrogen react with the hydrogen and form water, hydrogen sulphide, ammonia, carbon dioxide and carbon monoxide as by-products. The main hydroprocessing products are paraffinic hydrocarbons in the $C_{16}$-$C_{24}$ range. The long carbon chains of the fatty acids are isomerized, which improves the cold flow properties of the resulting fuel. In the present process, the isomerisation takes place before, after or simultaneously with the hydrodeoxygenation due to the combination of HDO and HDW catalysts and the packing of the catalyst material. Olefins and aromatic compounds are hydrogenated and fused ring systems are broken. This reduces the complexity of the compounds and improves the quality of the fuel. Cracking of large molecules, side chains and of some of the long chains occurs, which results in an increase of smaller useful molecules but also causes an increase in light gaseous products (methane, ethane, propane and butane).

The hydroprocessing reactions are highly exothermic and the temperature can rise to a level which is detrimental to the stability of the catalyst and/or product quality. In some cases, it may be necessary to control the temperature variations. Recirculation of at least a portion of the liquid hydrocarbon product stream and/or effluent gas stream and/or hydrogen stream provides an efficient means for constraining the exothermic reaction whereby the recycled streams act as media for lowering the temperature of the catalyst beds in a controlled manner. Said streams may be used for quenching at suitable locations.

The amount of hydrogen gas needed for the various hydroprocessing reactions depends on the amount and type of the feed material. The amount of hydrogen required depends also on the process conditions.

In the catalytic hydroprocessing the hydrogen partial pressure is maintained in the range from 50 to 250 bar, suitably from 80 to 200 bar, particularly suitably from 80 to 110 bar. The total pressure in the hydroprocessing is from 50 to 250 bar, suitably from 80 to 120 bar.

The hydroprocessing is carried out at a temperature in the range of 280° C. to 450° C., suitably at 350° C. to 400° C.

The feed rate WHSV (weight hourly spatial velocity) of the feedstock is proportional to an amount of the catalyst. The WHSV of the feed material in the present invention varies between 0.1 and 5, and is preferably in the range of 0.3-0.7.

The ratio of $H_2$/feed in the present invention depends on feedstock quality and varies between 600 and 4000 Nl/l, suitably of 1300-2200 Nl/l.

According to one embodiment the two stage alternative of the process may be carried out in at least two separate steps in at least two reactors. In the first step hydrodeoxygenation (HDO) is carried out and in the second step isomerization (HI) is carried out. Suitably a gaseous side stream containing hydrogen carbon monoxide, carbon dioxide, nitrogen, phosphorus and sulphur compounds, gaseous light hydrocarbons, water and other impurities is removed from the HDO step. A liquid stream may be withdrawn from between and/or after the HDO catalyst beds and water is removed from the condensed liquid to yield the HDO reaction product. The reaction product from HDO is subjected to an isomerization step. The impurities should be removed before the hydrocarbons are contacted with the isomerization catalyst. The isomerization and the HDO may be carried out in the same pressure vessel or in separate pressure vessels.

The reaction mixture from the hydroprocessing reactor system is directed to a separator, where water, the light component comprising hydrogen, light hydrocarbons (C1-C5 hydrocarbons), $H_2S$, CO and $CO_2$ are separated from the heavy component comprising ≥C5 hydrocarbons and some C1-C5 hydrocarbons. Typically a major part of the light hydrocarbons, and $H_2S$, CO, $H_2O$ and $CO_2$ are separated. The separation may be performed for example by cooling or flashing. Water and gases may also be separated by other means which are well known to those skilled in the art. Suitably a cold product separator is used where the heavy component stream comprising heavier >C5 hydrocarbons is separated from the light component. A water side stream and a stream comprising light gaseous components from the cold separator comprising hydrogen, light hydrocarbons (C1-C5 hydrocarbons), carbon monoxide, carbon dioxide, and hydrogen sulfide are separated.

The stream comprising light gaseous components is directed for purification to a separator capable of removing $H_2S$ and $CO_2$ from the gaseous stream which forms a recycle stream comprising $H_2$ and light hydrocarbons including methane. Examples of such separators are amine scrubbers (amine solution absorbers) and separation units utilizing membrane technology, suitably an amine scrubber is used. The obtained recycle stream may be directed to the hydroprocessing reactor system.

The liquid product comprising hydrocarbons having a carbon number of more than 5 may be subjected to fractionation. Suitably it is fed to a separation column where different fuel grade hydrocarbon fractions are recovered. From the bottom of the separation column, the heavier hydrocarbons may be recycled back to the inlet end of the hydroprocessing reactor system and mixed into the feedstock. The liquid hydrocarbon mixture obtained from the reactor system includes fuel grade hydrocarbons having a boiling point of at most 380° C. according to ISO EN 3405 (i.e. boiling in the liquid fuel range). The person skilled in the art is able to vary the distilling conditions and to change the temperature cut point as desired to obtain any suitable hydrocarbon product.

The recovered middle distillate fraction may comprise gas oil, i.e. a hydrocarbon fraction having a boiling point in the diesel range. A typical boiling point is from 160° C. to 380° C., meeting characteristics of the specification of EN 590 diesel. The diesel product may be fed to a diesel storage tank. Also hydrocarbon fractions distilling at temperatures ranging from 40° C. to 210° C. and at a temperature of about 370° C. can be recovered. These fractions are useful as high quality gasoline fuel and/or naphtha fuel, or as blending components for these fuels. Additionally, fraction suitable as solvents, aviation fuels, kerosene etc may be obtained.

The process of the present invention can be realized in any hydroprocessing reactor system suitable for producing biofuel or biofuel components.

The process may additionally comprise any conventional steps, such as separation of gases, scrubbing, washing, cooling, filtering, recovering of intermediates and products, mixing refining and/or fractionation of effluents. These embodiments can be used in combination with all the different embodiments of the invention.

The process may be batch-type or semi-batch-type or continuous, suitably a continuous process is used.

Due to the combination of multifunctional catalysts, complex compounds in the feed materials can be broken down into a mixture of hydrocarbons which provides an excellent basis for fuel and fuel components. Evaporation of the especially designed feedstock makes it possible to convert valuable materials in TOP to hydrocarbons useful as liquid fuels and provides and advantageous way of producing green fuel.

The process of the invention provides several advantages over prior art. TOP, which is generally regarded as highly viscous low value mixture of numerous compounds, can now be utilized together with CTO as feedstock in hydroprocessing, whereby even 70 wt % of TOP can be converted to hydrocarbons. It was surprising that the evaporative treatment can be carried out effectively, whereby the level of metals, P and Si in the evaporated feedstock can be decreased to levels allowing successful hydroprocessing. The present invention provides a balanced and compact process for the conversion of feedstock comprising CTO and TOP to liquid hydrocarbon products, suitable for use as a transportation fuels.

As TOP comprises significant amounts of neutral compounds having high molecular weight and carbon number more than 20, also the amount of hydrogen required in the HDO can be decreased.

EXAMPLES

In the following examples embodiments of the process for producing hydrocarbons are presented.

Example 1

Pretreatment of Feedstock Comprising CTO and TOP

The pretreatment was carried out as a 2 step evaporation. This 2 step evaporation simulated on small scale the four step evaporation.

2 runs were performed using in the first run feedstock A comprising 90 wt % of CTO and 10 wt % of TOP, and in the second run feedstock B comprising 80 wt % of CTO and 20 wt % of TOP. CTO contained 20-30 ppm of metals (total). The metal contents, sodium content, phosphorus content and silicon content (IPC) were determined in both feedstocks. The first evaporation step was carried out in a short path evaporator at the temperature of 210° C. and under pressure of 40 mbar and the second evaporation step was carried out in a second short path evaporator at the temperature of 345° C. and under the pressure of 0.3 mbar.

The results of the pretreatment runs are provided in Table 1.

TABLE 1

|  | Feed 1) CTO 90:TOP 10 (wt %) | Evaporated feed 1) | Feed 2) CTO 80:TOP 20 (wt %) | Evaporated feed 2) |
|---|---|---|---|---|
| Calcium ppm | 14.6 | <0.1 | 16.1 | 5.0 |
| Chromium ppm | 1.8 | <0.1 | 1.6 | <0.1 |
| Iron ppm | 2.7 | 1.7 | 3.3 | <0.1 |
| Potassium ppm | 6.6 | <0.1 | 5.9 | <0.1 |
| Magnesium ppm | 0.5 | <0.1 | 1.1 | <0.1 |
| Manganese ppm | 1.3 | <0.1 | 1.6 | <0.1 |
| Sodium ppm | 128 | 14 | 142 | 27 |
| Phosphorus ppm | 38.6 | 19.8 | 51.6 | 31 |
| Silicon ppm | 31.6 | 6.7 | 32.2 | 10 |
| Zinc p | 0.1 | <0.1 | 0.3 | <0.1 |
| Resin acids wt % | 22.4 | nd | 21.4 | nd |
| Acid value mgKOH/g | 133.3 | nd | 124.9 | nd |
| Unsaponifiables wt % | 16.9 | nd | 18.7 | nd |
| CTO residual soap number | 0.19 | nd | 0.2 | nd |
| Metals total ppm | 155.6 | 15.8 | 171.9 | 32 |
| Residue wt % |  | 7 |  | 8.8 | nd refers to "not determined"

From Table 1 it can be seen that the content of metals, Si, P and Na can be effectively decreased to an acceptable level, and the amount of heavy residue is surprisingly low, even when 20 vol % of TOP is used in the feedstock.

Example 2

Hydroprocessing of the Evaporated Feedstock Comprising CTO and TOP

Evaporated feedstocks 1) (CTO 90 wt %+TOP 10 wt %), and 2 (CTO 80 wt %+TOP 20 wt %) were subjected to hydroprocessing in a hydroprocessing reactor loaded with a mixed catalyst bed comprising $NiMo/Al_2O_3$ and $NiW/Al_2O_3$ catalysts (HDO/HDW). The hydroprocessing was carried out at 350-360° C. temperature, under a pressure of 90 bar hydrogen, LHSV was $0.2\ h^{-1}$, and $H_2$/oil ratio was 1500 $Nl(H_2)/l$ feed.

A sample was taken from the hydroprocessing effluent, which was fractionated to obtain a fraction boiling in the diesel range. The results are presented in Table 2.

TABLE 2

|  | yield G % | yield D % | CP ° C. | CFPP ° C. | recovery at 250° C. % (V/V) | recovery at 350° C. % (V/V) | 95% (V/V) recovery at ° C. | reaction T ° C. |
|---|---|---|---|---|---|---|---|---|
| 100% CTO | 7 | 71 | −3 | −10 | 27 | 98 | 335 | 352 |
| 10% TOP 90% CTO | 8 | 68 | −4 | −10 | 30 | 96 | 338 | 355 |
| 20% TOP 80% CTO | 8 | 68 | −4 | −10 | 30 | 95 | 347 | 356 |
| EN590 | — | — | — | — | <65 | min 85 | 360 | — |

G = naphtha fraction
D = diesel fraction
CTO = tall oil
TOP = tall oil pitch

From the results it can be seen that from the evaporated feedstock very similar product to the one obtained from 100% CTO feed can be achieved, having acceptable characteristics.

The present invention has been described herein with reference to specific embodiments. It is, however clear to those skilled in the art that the process may be varied within the scope of the claims.

The invention claimed is:

1. A process for producing hydrocarbons, wherein the process comprises the steps of:
   adding tall oil pitch to crude tall oil to prepare a feedstock comprising at least 50 wt % of crude tall oil and 0.1-40 wt % TOP (tall oil pitch);
   subjecting the feedstock to pretreatment comprising at least two evaporative steps to yield (i) an evaporated feedstock comprising 30 ppm or less of sodium, 35 ppm or less of phosphorus and 30 ppm or less of silicon, (ii) a light fraction comprising hydrocarbons having 1-5 carbon atoms and water, and (iii) a residue fraction; and
   subjecting the evaporated feedstock to catalytic hydroprocessing in the presence of hydrogen to yield a hydroprocessing product comprising hydrocarbons boiling in the range of 40 to 380° C.

2. The process for producing hydrocarbons according to claim 1, wherein the feedstock further comprises a co-feed selected from resin acids, fatty acid esters, and combinations thereof.

3. The process for producing hydrocarbons according to claim 1, wherein the evaporated feedstock comprises 25 ppm or less of sodium.

4. The process for producing hydrocarbons according to claim 1, wherein the evaporated feedstock comprises 15 ppm or less of sodium.

5. The process for producing hydrocarbons according to claim 1, wherein the evaporated feedstock comprises 25 ppm or less of phosphorus.

6. The process for producing hydrocarbons according to claim 1, wherein the evaporated feedstock comprises 20 ppm or less of phosphorus.

7. The process for producing hydrocarbons according to claim 1, wherein the evaporated feedstock comprises 20 ppm or less of silicon.

8. The process for producing hydrocarbons according to claim 1, wherein the evaporated feedstock comprises 10 ppm or less of silicon.

9. The process for producing hydrocarbons according to claim 1, wherein the feedstock comprises at least 60 wt % of crude tall oil.

10. The process for producing hydrocarbons according to claim 1, wherein the feedstock comprises at least 70 wt % of crude tall oil.

11. The process for producing hydrocarbons according to claim 1, wherein the feedstock comprises at least 80 wt % of crude tall oil.

12. The process for producing hydrocarbons according to claim 1, wherein the feedstock comprises at least 90 wt % of crude tall oil.

13. The process for producing hydrocarbons according to claim 1, wherein the feedstock comprises 2.5-30 wt % of tall oil pitch.

14. The process for producing hydrocarbons according to claim 1, wherein the feedstock comprises 2.5-20 wt % of tall oil pitch.

15. The process for producing hydrocarbons according to claim 1, wherein the feedstock comprises 2.5-10 wt % of tall oil pitch.

16. The process for producing hydrocarbons according to claim 1, wherein the feedstock comprises at least 60 wt % of crude tall oil, 2.5-30 wt % of tall oil pitch, and the evaporated feedstock comprises 25 ppm or less of sodium, 25 ppm or less of phosphorus and 20 ppm or less of silicon.

17. The process for producing hydrocarbons according to claim 1, wherein the feedstock comprises at least 70 wt % of crude tall oil, 2.5-20 wt % of tall oil pitch, and the evaporated feedstock comprises 15 ppm or less of sodium, 20 ppm or less of phosphorus and 10 ppm or less of silicon.

18. The process for producing hydrocarbons according to claim 17, wherein the feedstock comprises at least 80 wt % of crude tall oil and 2.5-10 wt % of tall oil pitch.

19. The process for producing hydrocarbons according to claim 1, wherein the pretreatment comprises from two to four evaporative steps.

20. The process for producing hydrocarbons according to claim 1, wherein the hydrogen partial pressure in the catalytic hydroprocessing is in the range from 50 to 250 bar.

21. The process for producing hydrocarbons according to claim 1, wherein the hydrogen partial pressure in the catalytic hydroprocessing is in the range from 60 to 200 bar.

22. The process for producing hydrocarbons according to claim 1, wherein the total pressure in the catalytic hydroprocessing is from 50 to 250 bar.

23. The process for producing hydrocarbons according to claim 1, wherein the total pressure in the catalytic hydroprocessing is from 80 to 160 bar.

24. The process for producing hydrocarbons according to claim 1, wherein the catalytic hydroprocessing is carried out at a temperature from 280 to 450° C.

25. The process for producing hydrocarbons according to claim 1, wherein the amount of tall oil pitch in the feedstock is adjusted to provide a sodium content in the feedstock of not more than 170 ppm.

26. The process for producing hydrocarbons according to claim 1, wherein the amount of tall oil pitch in the feedstock is adjusted to provide a sodium content in the feedstock of not more than 160 ppm.

27. The process for producing hydrocarbons according to claim 1, wherein the amount of tall oil pitch in the feedstock is adjusted to provide a sodium content in the feedstock of not more than 150 ppm.

28. The process for producing hydrocarbons according to claim 1, wherein the amount of tall oil pitch in the feedstock is adjusted to provide a sodium content in the feedstock of not more than 140 ppm.

29. The process for producing hydrocarbons according to claim 1, wherein the amount of tall oil pitch in the feedstock is adjusted to provide a phosphorus content in the feedstock of not more than 80 ppm.

30. The process for producing hydrocarbons according to claim 1, wherein the amount of tall oil pitch in the feedstock is adjusted to provide a phosphorus content in the feedstock of not more than 70 ppm.

31. The process for producing hydrocarbons according to claim 1, wherein the amount of tall oil pitch in the feedstock is adjusted to provide a phosphorus content in the feedstock of not more than 60 ppm.

32. The process for producing hydrocarbons according to claim 1, wherein the amount of tall oil pitch in the feedstock is adjusted to provide a phosphorus content in the feedstock of not more than 50 ppm.

33. The process for producing hydrocarbons according to claim 1, wherein the amount of tall oil pitch in the feedstock is adjusted to provide a silicon content in the feedstock of not more than 50 ppm.

34. The process for producing hydrocarbons according to claim 1, wherein the amount of tall oil pitch in the feedstock is adjusted to provide a silicon content in the feedstock of not more than 40 ppm.

35. The process for producing hydrocarbons according to claim 1, wherein the amount of tall oil pitch in the feedstock is adjusted to provide a silicon content in the feedstock of not more than 35 ppm.

36. The process for producing hydrocarbons according to claim 1, wherein the amount of tall oil pitch in the feedstock is adjusted to provide a silicon content in the feedstock of not more than 32 ppm.

37. The process for producing hydrocarbons according to claim 1, wherein at least one of the evaporative steps is carried out using a thin film evaporation technique.

38. The process for producing hydrocarbons according to claim 1, wherein the at least two evaporative steps are carried out in at least one evaporator, wherein the evaporator is selected from the group consisting of thin film evaporators, falling film evaporators, short path evaporators and plate molecular stills.

39. The process for producing hydrocarbons according to claim 1, wherein the pretreatment comprises four evaporative steps carried out in four evaporators arranged in series.

40. The process for producing hydrocarbons according to claim 1, wherein the pretreatment comprises two evaporative steps, wherein the two evaporative steps are performed using at least a first evaporator and a second evaporator, wherein the first evaporator is a thin film evaporator and the second evaporator is a short path evaporator or a thin film evaporator or a plate molecular still.

41. The process for producing hydrocarbons according to claim 40, wherein the first evaporator operates at a temperature of 150-200° C., and a pressure of 10-20 mbar, wherein the first evaporator separates said light fraction from a liquid fraction, wherein the liquid fraction is passed to the second evaporator which operates at a temperature of 300-390° C. and a pressure of 0.01-15 mbar, wherein the second evaporator separates said evaporated feedstock from said residue fraction.

42. The process for producing hydrocarbons according to claim 1, wherein the pretreatment comprises three evaporative steps, wherein the three evaporative steps are performed using at least a first evaporator, a second evaporator, and a third evaporator, wherein the first evaporator is a thin film evaporator or a falling film evaporator, the second evaporator is a plate molecular still or a thin film evaporator and the third evaporator is a short path evaporator or a thin film evaporator.

43. The process for producing hydrocarbons according to claim 42, wherein the first evaporator is operated at a temperature of 50-250° C. and a pressure of 5-100 mbar, the second evaporator is operated at a temperature of 180-350° C. and a pressure of 0.1-40 mbar, and the third evaporator is operated at a temperature of 200-450° C. and a pressure of 0-50 mbar, wherein the pretreatment comprises:
 (i) passing the feedstock to the first evaporator to separate said light fraction from a liquid product;
 (ii) passing the liquid product to the second evaporator to separate a distillate from a liquid fraction;
 (iii) passing the liquid fraction to the third evaporator to separate an effluent from said residue fraction; and
 (iv) combining the effluent from the third evaporator with the distillate from the second evaporator to form the evaporated feedstock.

44. The process for producing hydrocarbons according to claim 1, wherein the pretreatment comprises four evaporative steps, wherein the four evaporative steps are performed using at least a first evaporator, a second evaporator, a third evaporator, and a fourth evaporator, wherein the first evaporator is a falling film evaporator or a plate molecular still or a thin film evaporator, the second evaporator is a thin film evaporator or a short-path evaporator or a plate molecular still, the third evaporator is a thin film evaporator or plate molecular still or short path evaporator, and the fourth evaporator is a short path evaporator or a plate molecular still.

45. The process for producing hydrocarbons according to claim 44, wherein the first evaporator is operated at a temperature of 80 to 150° C. and a pressure from 40 to 80 mbar, the second evaporator is operated at a temperature of 180 to 250° C. and a pressure of 40 to 80 mbar, the third evaporator is operated at a temperature of 200 to 350° C. and a pressure of 0.01 to 50 mbar, and the fourth evaporator is operated at a temperature of 250 to 400° C. and a pressure of 0.01 to 10 mbar, wherein the pretreatment comprises:
(i) passing the feedstock to the first evaporator to separate said light fraction from a fraction comprising fatty acids, resin acids and neutral substances;
(ii) passing the fraction comprising fatty acids, resin acids and neutral substances to the second evaporator to separate a fraction comprising water and low boiling light hydrocarbon components having boiling points of 100-210° C. from a liquid fraction;
(iii) passing the liquid fraction to the third evaporator to separate a distillate comprising fatty acids from a liquid phase;
(iv) passing the liquid phase to the fourth evaporator to separate a second distillate from said residue fraction; and
(v) combining the second distillate from the fourth evaporator with the distillate comprising fatty acids from the third evaporator to form the evaporated feedstock.

46. The process for producing hydrocarbons according to claim 1, wherein the catalytic hydroprocessing is carried out in one stage wherein the catalytic hydroprocessing comprises hydrodeoxygenation and hydrodewaxing, or the catalytic hydroprocessing is carried out in at least two stages, wherein hydrodeoxygenation is carried out in the first stage and hydroisomerization and/or hydrodewaxing is carried out in the second stage.

47. The process for producing hydrocarbons according to claim 46, wherein the catalytic hydroprocessing is carried out in one stage using at least one catalyst capable of performing hydrodeoxygenation and hydrodewaxing reactions.

48. The process for producing hydrocarbons according to claim 46, wherein the catalytic hydroprocessing is carried out in two stages, wherein a hydrodeoxygenation catalyst is used in the first stage and a hydroisomerization catalyst is used in the second stage.

49. The process for producing hydrocarbons according to claim 48, wherein the hydrodeoxygenation catalyst is selected from the group consisting of NiMo, CoMo, and a mixture of Ni, Mo and Co, on a support selected from the group consisting of $Al_2O_3$, $SiO_2$, $ZrO_2$, zeolites, zeolite-alumina, alumina-silica, alumina-silica-zeolite, activated carbon, and mixtures thereof.

50. The process for producing hydrocarbons according to claim 47, wherein the catalyst is based on Ni, W, and molecular sieves, supported on an oxide support.

51. The process for producing hydrocarbons according to claim 47, wherein the catalyst is selected from the group consisting of NiW/$Al_2O_3$, NiW/$Al_2O_3$—$SiO_2$ and NiW/zeolite/$Al_2O_3$.

52. The process for producing hydrocarbons according to claim 1, wherein a WHSV of the evaporated feedstock in the catalytic hydroprocessing is between 0.1 and 5 $h^{-1}$.

53. The process for producing hydrocarbons according to claim 1, wherein a WHSV of the evaporated feedstock in the catalytic hydroprocessing is between 0.3 and 0.7 $h^{-1}$.

54. The process for producing hydrocarbons according to claim 1, wherein an $H_2$/evaporated feedstock ratio in the catalytic hydroprocessing is between 600 and 4000 Nl/l.

55. The process for producing hydrocarbons according to claim 1, wherein an $H_2$/evaporated feedstock ratio in the catalytic hydroprocessing is between 1300 and 2200 Nl/l.

56. A product obtained by the process according to claim 1.

* * * * *